(12) United States Patent
Hsieh et al.

(10) Patent No.: US 10,811,878 B2
(45) Date of Patent: Oct. 20, 2020

(54) POWER DISTRIBUTION UNIT HAVING CAPABILITY FOR REMAINING POWER MANAGEMENT

(71) Applicant: CYBER POWER SYSTEMS, INC., Taipei (TW)

(72) Inventors: Hung-Ming Hsieh, Taipei (TW); Shang-Hsiu Yang, Taipei (TW)

(73) Assignee: CYBER POWER SYSTEMS, INC., Taipei (TW)

( * ) Notice: Subject to any disclaimer, the term of this patent is extended or adjusted under 35 U.S.C. 154(b) by 542 days.

(21) Appl. No.: 15/204,516

(22) Filed: Jul. 7, 2016

(65) Prior Publication Data

US 2017/0077702 A1    Mar. 16, 2017

(30) Foreign Application Priority Data

Sep. 16, 2015   (TW) .............................. 104130539 A

(51) Int. Cl.
| | |
|---|---|
| *H02J 3/14* | (2006.01) |
| *H04L 12/10* | (2006.01) |
| *H02J 9/06* | (2006.01) |
| *G06F 1/3209* | (2019.01) |
| *G06F 1/18* | (2006.01) |
| *H04L 29/12* | (2006.01) |

(52) U.S. Cl.
CPC ................ *H02J 3/14* (2013.01); *G06F 1/189* (2013.01); *G06F 1/3209* (2013.01); *H02J 9/06* (2013.01); *H04L 12/10* (2013.01); *H04L 61/2007* (2013.01); *Y02B 70/3225* (2013.01); *Y02B 70/3291* (2013.01); *Y04S 20/222* (2013.01); *Y04S 20/248* (2013.01)

(58) Field of Classification Search
CPC ..... G06F 1/30; G06F 1/26; G06F 1/28; G06F 1/189; G06F 1/266; G06F 1/3246; G06F 11/3058; G06F 11/3062; G06F 1/3209; G06F 2200/261; G06F 1/263; G06F 1/3203; G06F 9/442; G05B 15/02
See application file for complete search history.

(56) References Cited

U.S. PATENT DOCUMENTS

| | | | |
|---|---|---|---|
| 6,721,672 B2 | 4/2004 | Spitaels et al. | |
| 7,082,541 B2 * | 7/2006 | Hammond | ................ G06F 1/30 709/202 |
| 7,522,036 B1 * | 4/2009 | Preuss | .................. H05K 7/1457 307/150 |

(Continued)

FOREIGN PATENT DOCUMENTS

CN        102047527 A       5/2011

*Primary Examiner* — Darrin D Dunn
(74) *Attorney, Agent, or Firm* — Bacon & Thomas, PLLC

(57) ABSTRACT

A PDU (power distribution unit) having capability for remaining power management, the PDU has a plurality of first outlets, the PDU can electrically connect with a UPS (Uninterruptible Power Supply), the PDU and the UPS can be communicatively connected to a manager; wherein the PDU can receive a remaining power parameter which is transmitted from the UPS, the manager can use the user interface to display the remaining power parameter, and the manager can use the user interface to set up at least one outlet action, the PDU can control at least one the first outlet to execute the outlet action according to the remaining power parameter.

16 Claims, 14 Drawing Sheets

(56) References Cited

U.S. PATENT DOCUMENTS

| | | | |
|---|---|---|---|
| 9,069,544 B2* | 6/2015 | Hsieh | H02J 9/00 |
| 9,110,450 B2* | 8/2015 | Alberth, Jr. | G05B 11/01 |
| 9,142,971 B2* | 9/2015 | Ewing | H04L 12/10 |
| 9,450,386 B2* | 9/2016 | Ewing | G06F 1/26 |
| 9,684,349 B2* | 6/2017 | Fallon | H02J 9/062 |
| 9,727,117 B2* | 8/2017 | Calio | G06F 1/3209 |
| 9,847,672 B2* | 12/2017 | Fallon | H02J 9/04 |
| 9,910,472 B1* | 3/2018 | Wishman | G06F 1/30 |
| 10,050,670 B1* | 8/2018 | Hill | G06F 1/189 |
| 2003/0033550 A1* | 2/2003 | Kuiawa | H04L 43/045 |
| | | | 713/340 |
| 2003/0132949 A1* | 7/2003 | Fallon | G06F 1/28 |
| | | | 715/700 |
| 2004/0117533 A1* | 6/2004 | Fallon | G06F 1/30 |
| | | | 710/260 |
| 2005/0097374 A1* | 5/2005 | Aharonian | G06F 1/30 |
| | | | 713/300 |
| 2005/0206241 A1* | 9/2005 | Saxena | H02J 9/06 |
| | | | 307/66 |
| 2007/0037420 A1* | 2/2007 | Ohman | H02J 9/06 |
| | | | 439/108 |
| 2007/0114971 A1* | 5/2007 | Uesaka | G01R 31/3624 |
| | | | 320/132 |
| 2007/0168088 A1* | 7/2007 | Ewing | H02J 3/14 |
| | | | 700/295 |
| 2007/0276548 A1* | 11/2007 | Uzunovic | G06F 1/266 |
| | | | 700/297 |
| 2008/0019067 A1* | 1/2008 | Reynolds | G06F 1/30 |
| | | | 361/93.1 |
| 2009/0189451 A1* | 7/2009 | Roepke | G06F 1/30 |
| | | | 307/66 |
| 2010/0042860 A1* | 2/2010 | Kwon | G06F 1/3203 |
| | | | 713/340 |
| 2010/0214109 A1* | 8/2010 | Reynolds | H04L 67/025 |
| | | | 340/664 |
| 2010/0250160 A1* | 9/2010 | Spitaels | G05B 15/02 |
| | | | 702/61 |
| 2011/0062780 A1* | 3/2011 | Verges | H02J 13/0017 |
| | | | 307/38 |
| 2012/0098342 A1* | 4/2012 | Johnson, Jr. | H02J 9/062 |
| | | | 307/48 |
| 2013/0076132 A1* | 3/2013 | Cohen | G06F 1/30 |
| | | | 307/22 |
| 2013/0201305 A1* | 8/2013 | Sibecas | H04N 5/44591 |
| | | | 348/54 |
| 2013/0246814 A1* | 9/2013 | Hsieh | G06F 1/30 |
| | | | 713/300 |
| 2013/0289789 A1* | 10/2013 | Ewing | G06F 1/266 |
| | | | 700/295 |
| 2014/0368033 A1* | 12/2014 | Manikandan | H02J 7/0047 |
| | | | 307/23 |
| 2015/0008747 A1* | 1/2015 | Salcone | H02J 9/062 |
| | | | 307/66 |
| 2015/0362941 A1* | 12/2015 | Ewing | G06F 1/28 |
| | | | 700/295 |
| 2016/0011639 A1* | 1/2016 | Ewing | G06F 1/26 |
| | | | 710/110 |
| 2016/0054771 A1* | 2/2016 | Fallon | G06F 1/26 |
| | | | 713/300 |
| 2016/0070282 A1* | 3/2016 | Chapel | H04L 12/10 |
| | | | 700/292 |
| 2016/0094089 A1* | 3/2016 | Bailey | H05K 7/1492 |
| | | | 307/66 |
| 2016/0118121 A1* | 4/2016 | Kelly | G06F 13/4068 |
| | | | 710/301 |
| 2016/0126783 A1* | 5/2016 | Cheng | H02J 9/061 |
| | | | 307/66 |
| 2016/0305991 A1* | 10/2016 | Nicholson | G06F 11/3062 |
| 2016/0328010 A1* | 11/2016 | Cochran | G06F 1/30 |
| 2016/0365750 A1* | 12/2016 | Fallon | H02J 9/04 |
| 2017/0033559 A1* | 2/2017 | Chien | G06F 1/266 |
| 2017/0039116 A1* | 2/2017 | Kelly | G06F 1/30 |
| 2017/0047772 A1* | 2/2017 | Wang | H05K 7/1492 |
| 2017/0110907 A1* | 4/2017 | Grehan | G06F 1/30 |
| 2017/0111981 A1* | 4/2017 | Recker | H05B 33/0854 |
| 2017/0177066 A1* | 6/2017 | Linder | G06F 1/3296 |
| 2018/0157284 A1* | 6/2018 | Ewing | G05B 15/02 |
| 2018/0233947 A1* | 8/2018 | Mills | H02J 9/06 |
| 2018/0241244 A1* | 8/2018 | Stevens | H02J 13/0003 |

\* cited by examiner

POWER DISTRIBUTION UNIT HAVING CAPABILITY FOR REMAINING POWER MANAGEMENT

BACKGROUND OF THE INVENTION

1. Field of the Invention

The invention relates to a power distribution unit having capability for remaining power management, and more particularly to a PDU (power distribution unit) can electrically connect a UPS (Uninterruptible Power Supply) to enable the UPS to transmit a remaining power parameter, the PDU can receive the remaining power parameter, and the PDU can control at least one outlet according to the remaining power parameter, therefore the remaining power of the UPS can be effectively used.

2. Description of Related Art

A prior-art is disclosed in U.S. Pat. No. 6,721,672, the prior-art disclosed a UPS is electrically connected to a PDU, and some actions may be initiated by the controller, these actions include sending notifications, logging problems and taking corrective actions. The notifications can include recording an event in a log and activating an audio or visual alarm. Further, the notifications may include sending an email to a system administrator or facility manager or paging the administrator or manager. But the prior-art did not manage the remaining power of the UPS, and the prior-art can not preferentially use the remaining power of the UPS to the important apparatus of the PDU. Thus, there is a requirement of improvement for the prior-art.

SUMMARY OF THE INVENTION

It is therefore an object of the invention to provide a PDU having capability for remaining power management, the PDU comprises a power input terminal, a plurality of first outlets, a plurality of relays, a first processor and a first network interface; the power input terminal is electrically connected to a UPS, the first outlets are parallelly connected to the power input terminal, each relay is electrically connected to each first outlet, the first processor can be provided with a user interface, the first network interface and the UPS can be communicatively connected to a manager; wherein the first processor can use the first network interface to receive a remaining power parameter which is transmitted from the UPS, the manager can use the user interface to display the remaining power parameter, and the manager can use the user interface to set up at least one outlet action, the first processor can control at least one the relay according to the remaining power parameter, therefore at least one the first outlet can execute the outlet action.

It is therefore another object of the invention to provide a PDU having capability for remaining power management, the PDU comprises a power input terminal, a plurality of first outlets, a plurality of relays, a first processor, a display unit and a first network interface; the power input terminal is electrically connected to a UPS, the first outlets are parallelly connected to the power input terminal, each relay is electrically connected to each first outlet, the first processor can be provided with a user interface, the display unit is electrically connected to the first processor, the first network interface can be communicatively connected to the UPS; wherein the first processor can use the first network interface to receive a remaining power parameter which is transmitted from the UPS, the display unit can use the user interface to display the remaining power parameter, and the display unit can use the user interface to set up at least one outlet action, the first processor can control at least one the relay according to the remaining power parameter, therefore at least one the first outlet can execute the outlet action.

First advantages of the invention is, the remaining power of the UPS can be effectively managed, the PDU and the manager can obtain an warning of the remaining power, the PDU can further execute a pre-setting outlet action according to the remaining power status, the remaining power of the UPS can be preferentially used for the important apparatus of the PDU, and therefore achieve the effective using purpose of the remaining power.

Second advantages of the invention is, the remaining power parameter of the UPS can be a remaining power capacity or a remaining runtime, the remaining runtime is equal to the remaining power capacity divided by the power consumption speed of the PDU, the user interface can use a floating way to display the remaining power capacity or the remaining runtime.

Third advantages of the invention is, the user interface can be provided with a configuration page of input power, the configuration page of input power can be used for starting the binding of the PDU and the UPS, setting up an IP (internet protocol) address of the UPS, and resetting up the IP address of the UPS.

Fourth advantages of the invention is, the user interface can be provided with a status page, the status page has a load area and an input power area, the load area can be used to display a load status of the PDU, the input power area can be used to display the remaining power parameter.

Fifth advantages of the invention is, the user interface can be provided with a setting page of power event, the setting page of power event has a type field, a setting value field, an outlet action field and an outlet number field, a type of the remaining power parameter can be set up by the type field, a value of the remaining power parameter can be set up by the setting value field, an outlet action can be set up by the outlet action field, the outlet number of at least one the first outlet can be set up by the outlet number field.

The above and other objects, features and advantages of the invention will become apparent from the following detailed description taken with the accompanying drawings.

DETAILED DESCRIPTION OF THE INVENTION

Figure 1:
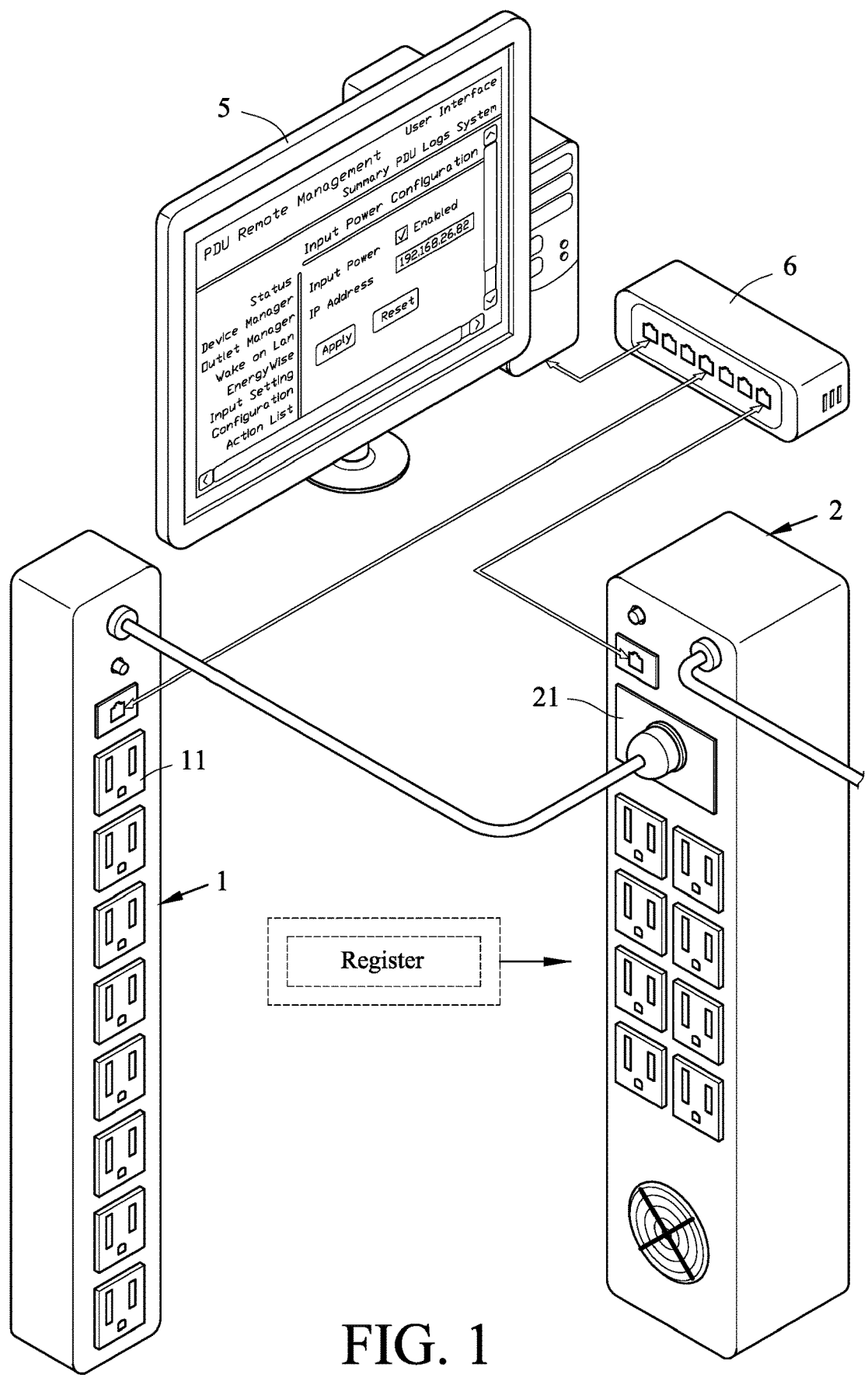
FIG. 1 is an IP address registration diagram illustrating a first embodiment of the invention.

Referring to FIGS. 1 to 8, a PDU (power distribution unit) 1 in accordance with a first embodiment of the invention comprises a power input terminal 10, a plurality of first outlets 11, a plurality of relays 110, a first processor 12 and a first network interface (communication interface) 13; the power input terminal 10 is electrically connected to a UPS (Uninterruptible Power Supply) 2, the UPS 2 is electrically connected to a mains power supply 3, the first outlets 11 are parallelly connected to the power input terminal 10, each relay 110 is electrically connected to each first outlet 11, the first processor 12 can be provided with a user interface 50, the user interface 50 can be used to register an IP (internet protocol) address of the UPS 2, the first network interface 13 and the UPS 2 can be communicatively connected to a manager 5 (e.g., a computer apparatus provided with a Web browser function); wherein the first processor 12 can use the first network interface 13 to receive a remaining power parameter which is transmitted from the UPS 2, the manager 5 can use the user interface 50 to display the remaining power parameter, and the manager 5 can use the user interface 50 to set up at least one outlet action, the first processor 12 can control at least one relay 110 according to the remaining power parameter, therefore at least one first outlet 11 can execute the outlet action. Thus, the invention can effectively manage the remaining power of the UPS 2, the PDU 1 and the manager 5 can obtain an warning of the remaining power, the PDU 1 can further execute a pre-setting outlet action according to the remaining power status, the remaining power of the UPS 2 can be preferentially used for the important apparatus of the PDU 1 (not shown), and therefore achieve the effective using purpose of the remaining power.

Figure 5:
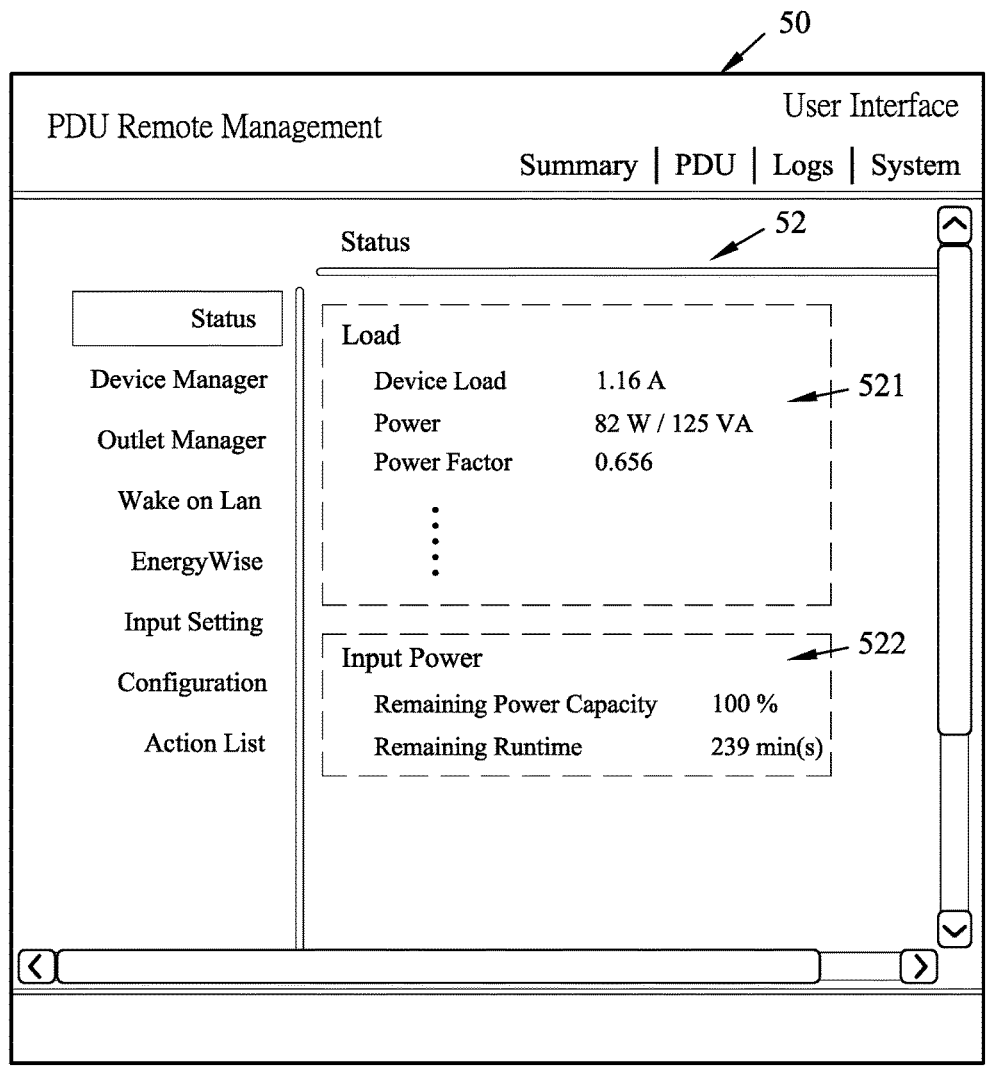
FIG. 5 is a status page of user interface diagram illustrating the invention.

Examples of a first executing manner of the remaining power parameter, as shown in FIG. 5, the remaining power parameter can be a remaining power capacity of the UPS 2 in each regular time period, the user interface 50 can use a floating percentage way to display the remaining power capacity.

Examples of a second executing manner of the remaining power parameter, as shown in FIG. 5, the remaining power parameter can be a remaining runtime of the UPS 2, a second processor 22 of the UPS 2 can estimate a remaining runtime according to a remaining power capacity of the UPS 2, the remaining runtime is equal to the remaining power capacity divided by the power consumption speed of the PDU 1, the user interface 50 can use a floating way to display the remaining runtime.

Figure 3:
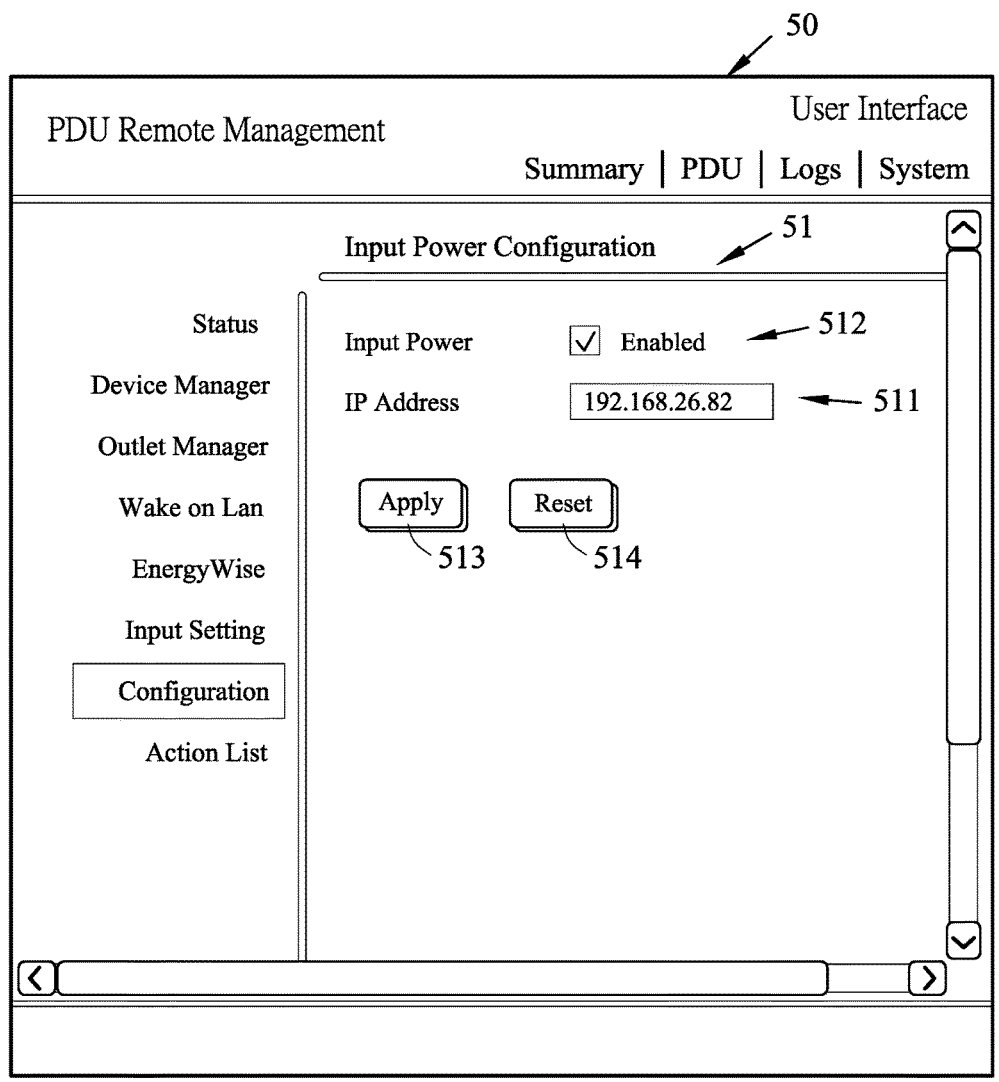
FIG. 3 is an input power configuration page of user interface diagram illustrating the invention.
Figure 4:
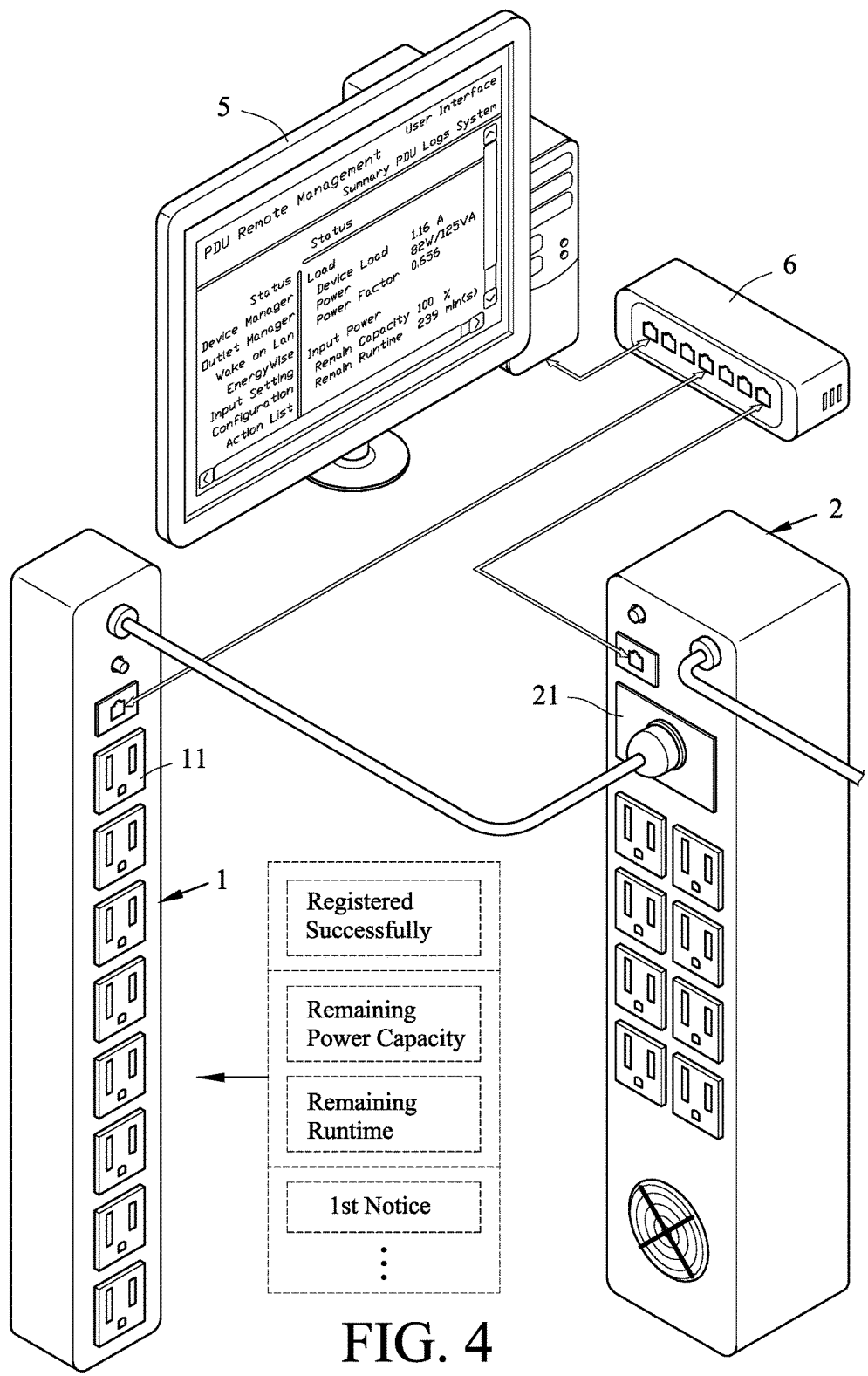
FIG. 4 is a transmitting and displaying the remaining power parameter diagram illustrating the first embodiment of the invention.

Examples of an executing manner of the user interface 50, as shown in FIG. 3, the user interface 50 can be provided with an input power configuration page 51, the input power configuration page 51 has an IP Address field 511, and thereby input an IP address of the UPS 2. Moreover, the input power configuration page 51 has an Input Power option 512, a Apply button 513 and a Reset button 514; wherein the Input Power option 512 can be used to start the binding of the PDU 1 and the UPS 2, the Apply button 513 can be used to set up the IP address of the UPS 2, the Reset button 514 can be used to reset up the IP address of the UPS 2. After the registration is succeeded, the UPS 2 will transmit a message of Registered Successfully and a remaining power parameter to the PDU 1, as shown in FIG. 4, and furthermore the manager 5 can display the remaining power parameter. The user interface 50 can be provided with a status page 52, the status page 52 has a Load area 521 and an Input Power area 522, as shown in FIG. 5, the Load area 521 can be used to display a load status of the PDU 1, the Input Power area 522 can be used to display the remaining power parameter. The UPS 2 can regularly transmit a remaining power parameter to the PDU 1, as shown in FIG. 4, the manager 5 can display the remaining power parameter.

Figure 6:
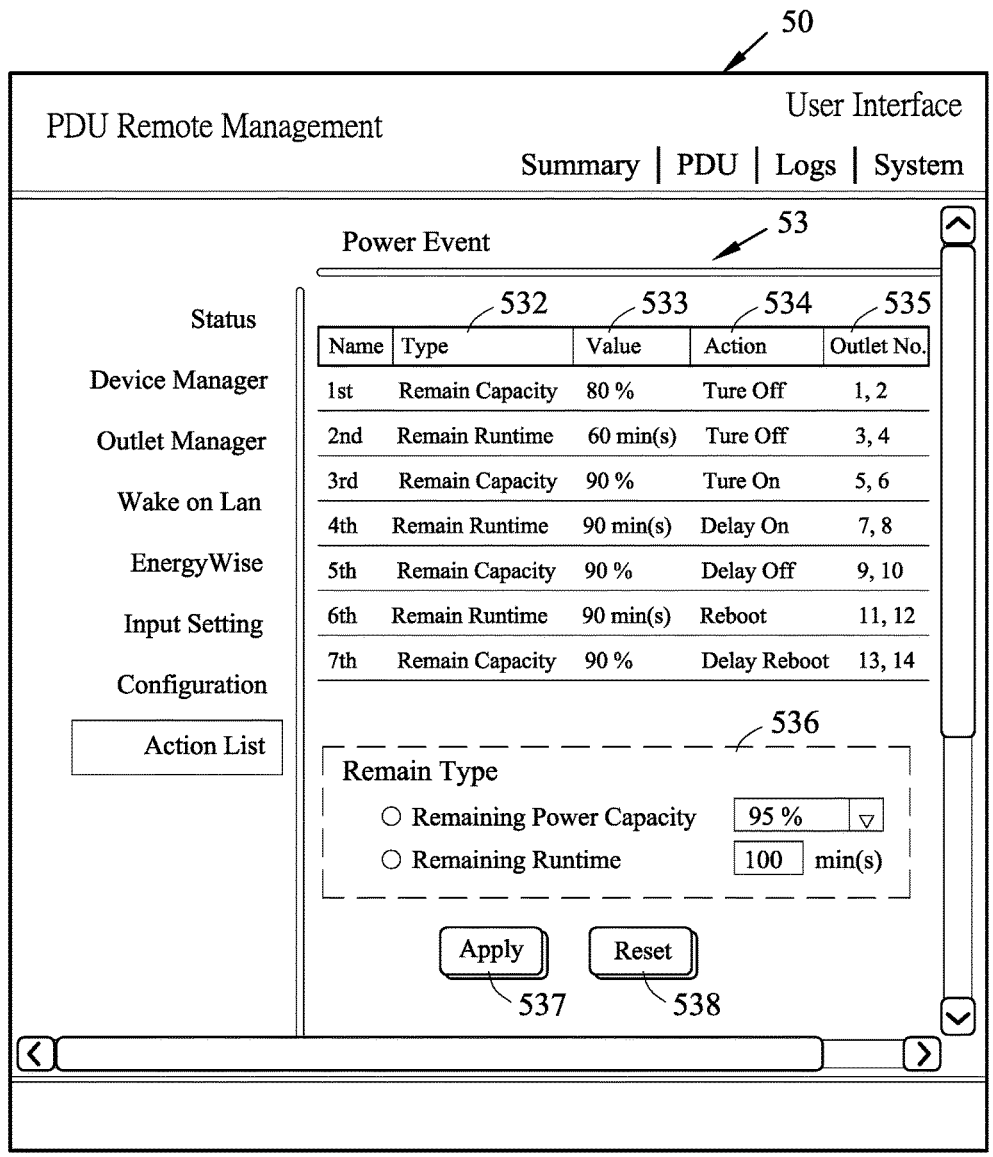
FIG. 6 is a power event setting page of user interface diagram illustrating the invention.

Examples of a first setting manner of outlet action, as shown in FIG. 6, the user interface 50 can be provided with a power event setting page 53, the power event setting page 53 has a type field 532, a setting value field 533, an outlet action field 534 and an outlet number field 535; wherein the type field 532 can appoint a type of remaining power parameter, the setting value field 533 can set up a value of remaining power parameter, the outlet action field 534 can set up an outlet action, the outlet number field 535 can set up the outlet number of at least one first outlet 11. Examples of an executing manner of the power event setting page 53, the power event setting page 53 has an input area 536, a Apply button 537 and a Reset button 538; wherein user can use the input area 536 to select a type of remaining power parameter, and user can use the input area 536 to input a value of remaining power parameter. User can click the Apply button 537 to confirm the selection of the input area 536 and the input of the input area 536, at this time, the type of remaining power parameter selected by the input area 536 will be added to the type field 532, and the value of remaining power parameter inputted by the input area 536 will be added to the setting value field 533. User can click the Reset button 538 to reset up the selection of the input area 536 and the input of the input area 536, at this time, the type of remaining power parameter selected by the input area 536 will be deleted from the type field 532, and the value of remaining power parameter inputted by the input area 536 will be deleted from the setting value field 533. The type of remaining power parameter can be selected from a remaining power capacity of the UPS 2 or a remaining runtime, the value of remaining power parameter can be selected from a percentage of the remaining power capacity or a time value of the remaining runtime. The outlet action can be selected from the Turn On, the Turn Off, the Delay On, the Delay Off, the Reboot or the Delay Reboot. When the power status of the UPS 2 is conformed to the above setting value of remaining power parameter, the UPS 2 will transmit a Notice to the PDU 1, as shown in FIG. 4, the PDU 1 will execute the above setting outlet action according to the Notice, and furthermore the manager 5 can display the outlet action.

Figure 7:
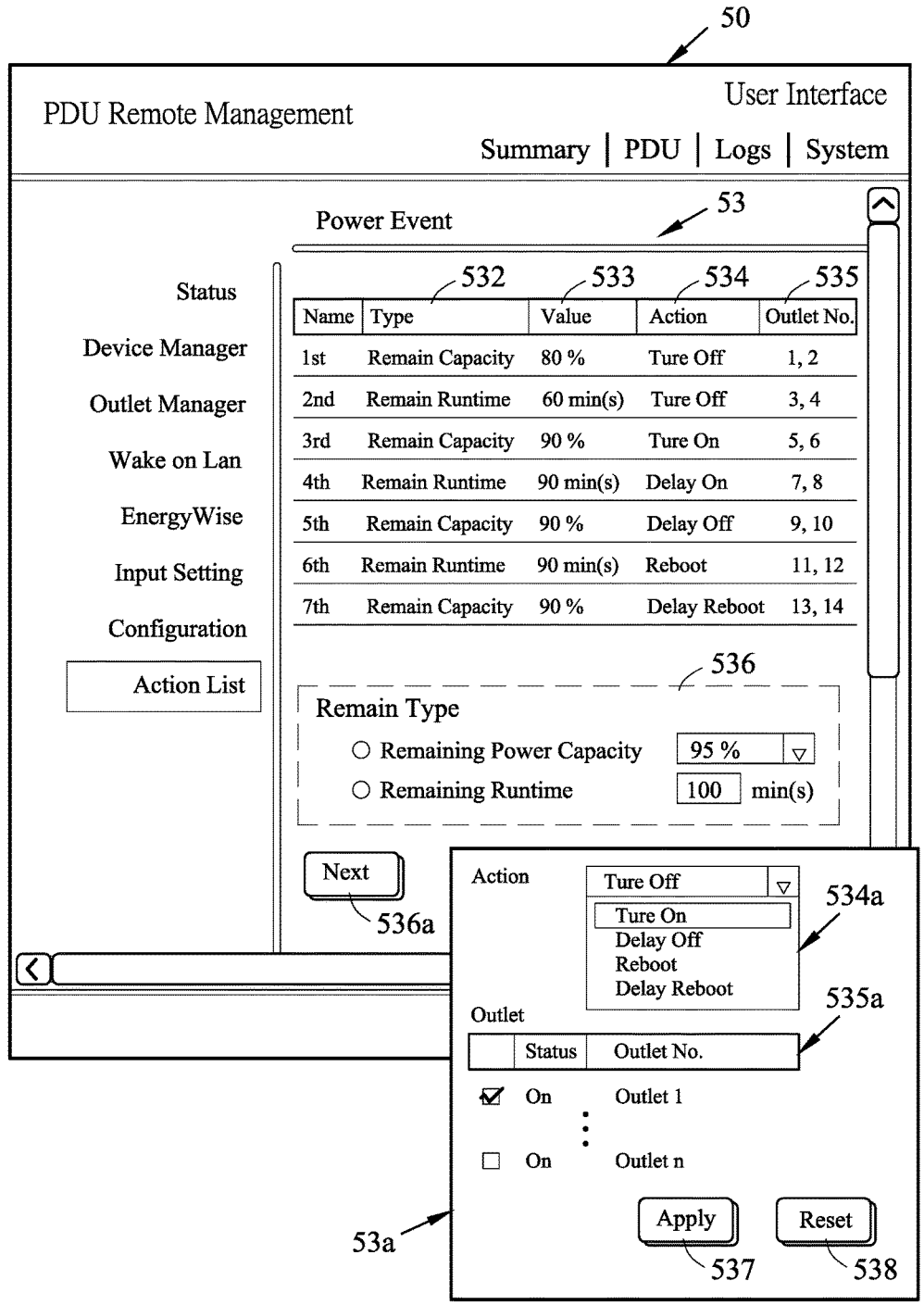
FIG. 7 is a power event setting subpage of user interface diagram illustrating the invention.

Examples of a second setting manner of outlet action, as shown in FIG. 7, the user interface 50 can be provided with a power event setting page 53, the power event setting page 53 has a type field 532, a setting value field 533, an outlet action field 534 and an outlet number field 535. Examples of an executing manner of the power event setting page 53, the power event setting page 53 has an input area 536 and a Next button 536a; wherein user can use the input area 536 to select a type of remaining power parameter, and user can use the input area 536 to input a value of remaining power parameter. User can click the Next button 536a to enable the user interface 50 to supply a power event setting subpage 53a, the power event setting subpage 53a has an outlet action option 534a, an outlet number option 535a, a Apply button 537 and a Reset button 538. After the selection content of the input area 536, the selection content of the outlet action option 534a and the selection content of the outlet number option 535a are finished, user can click the Apply button 537 to enable the selection contents to add to the type field 532, the setting value field 533, the outlet action field 534 and the outlet number field 535. User can click the Reset button 538 to reset up the outlet action option 534a and the outlet number option 535a. The type of remaining power parameter, the value of remaining power parameter and the outlet action are almost same as the first setting manner.

Figure 8:
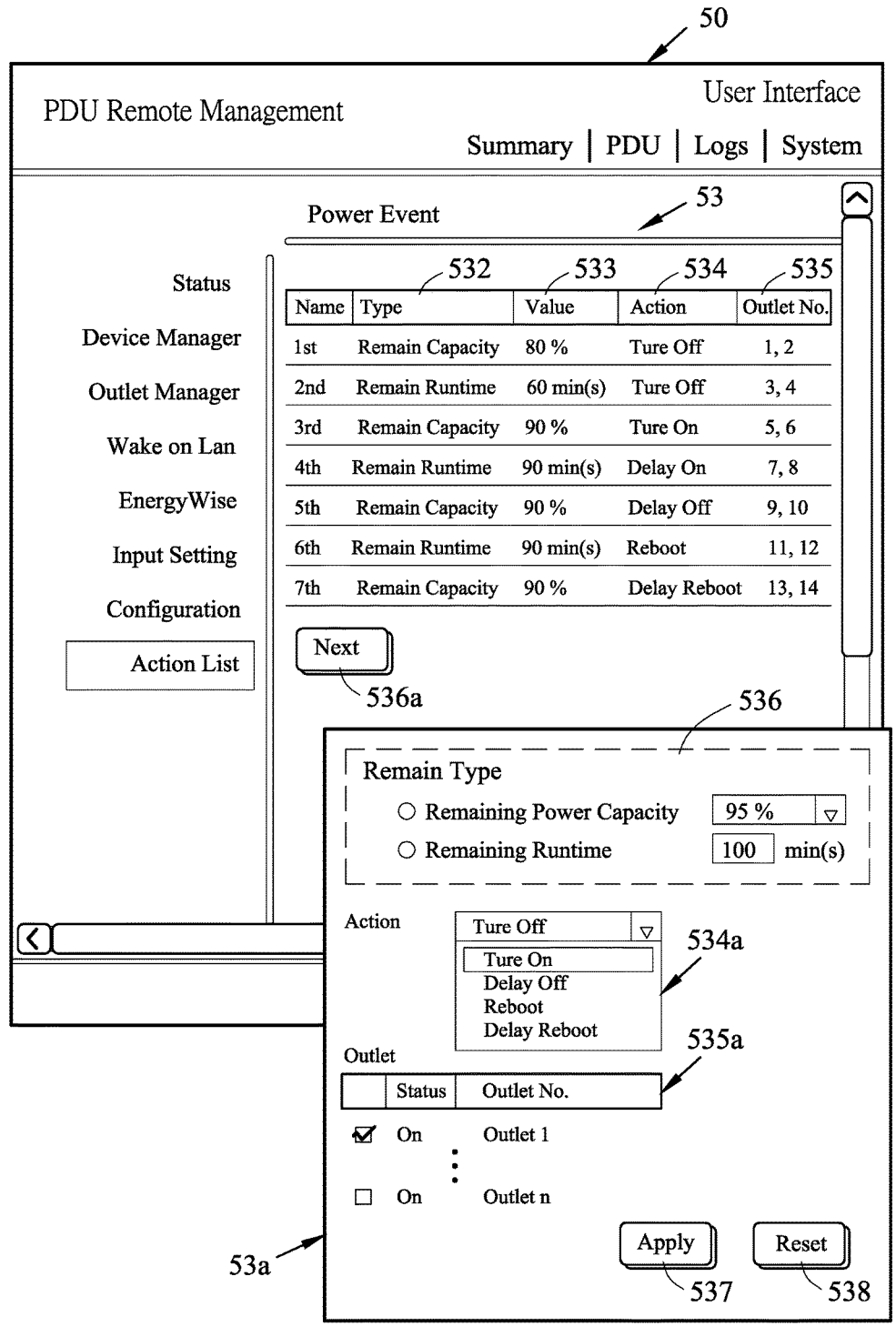
FIG. 8 is another power event setting subpage of user interface diagram illustrating the invention.

Examples of a third setting manner of outlet action, as shown in FIG. 8, the user interface 50 can be provided with a power event setting page 53, the power event setting page 53 has a type field 532, a setting value field 533, an outlet action field 534 and an outlet number field 535. Examples of an executing manner of the power event setting page 53, the power event setting page 53 has a Next button 536a. User can click the Next button 536a to enable the user interface 50 to supply a power event setting subpage 53a, the power event setting subpage 53a has an input area 536, an outlet action option 534a, an outlet number option 535a, a Apply button 537 and a Reset button 538. User can use the input area 536 to select a type of remaining power parameter, and user can use the input area 536 to input a value of remaining power parameter. After the selection content of the input area 536, the selection content of the outlet action option 534a and the selection content of the outlet number option 535a are finished, user can click the Apply button 537 to enable the selection contents to add to the type field 532, the setting value field 533, the outlet action field 534 and the outlet number field 535. User can click the Reset button 538 to reset up the input area 536, the outlet action option 534a and the outlet number option 535a. The type of remaining power parameter, the value of remaining power parameter and the outlet action are almost same as the first setting manner.

Figure 2:
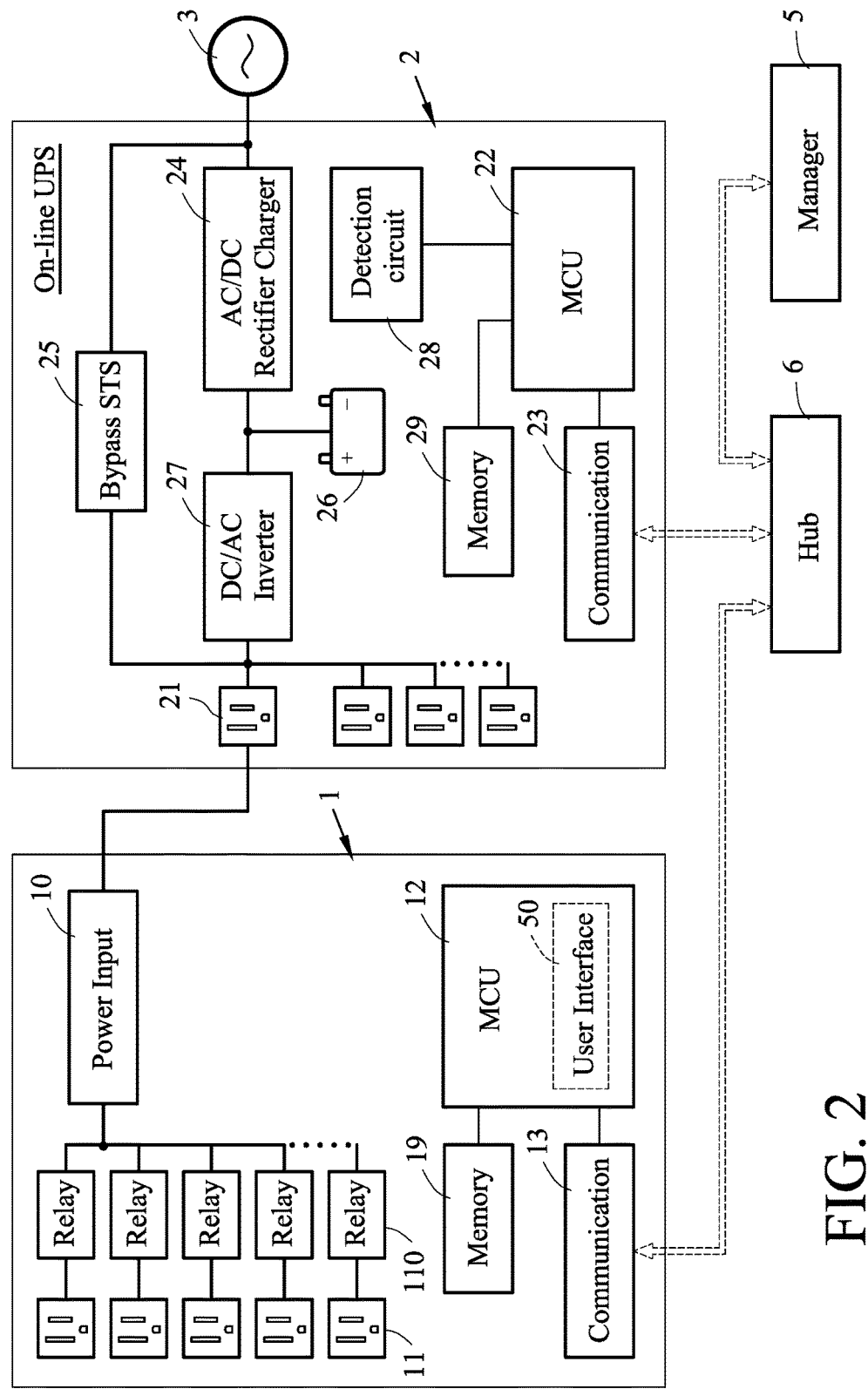
FIG. 2 is a first functional block diagram illustrating the first embodiment of the invention.

Examples of a first executing manner of the UPS 2, as shown in FIG. 2, the UPS 2 has at least one second outlet 21, a second processor 22, a rechargeable battery 26 and a second network interface 23, the power input terminal 10 of the PDU 1 is electrically connected to the second outlet 21 of the UPS 2, the second processor 22 can detect a remaining power parameter of the rechargeable battery 26 by a detecting circuit 28; the manager 5 can use a Hub 6 to communicate with the first network interface 13 and the second network interface 23; a second memory 29 can be used as the memory of the UPS 2, the remaining power parameter can be saved in the second memory 29. The UPS 2 can be an on-line UPS, and furthermore the UPS 2 has an AC to DC (Alternating Current to Direct Current) rectifier charger 24, a bypass STS (static switch) 25 and a DC to AC inverter 27. When the mains power supply 3 can normally supply power to the UPS 2, the mains power supply 3 can charge the rechargeable battery 26 by the AC to DC rectifier charger 24, the mains power supply 3 can supply power to the second outlet 21 by the bypass STS 25. When the mains power supply 3 is abnormal, or the power supply is interrupted, the rechargeable battery 26 can supply power to the second outlet 21 by the DC to AC inverter 27, the second processor 22 can transmit the remaining power parameter to the PDU 1 by the second network interface 23. Moreover, a first memory 19 can be used as the memory of the PDU 1, the remaining power parameter can be also saved in the first memory 19.

Figure 9:
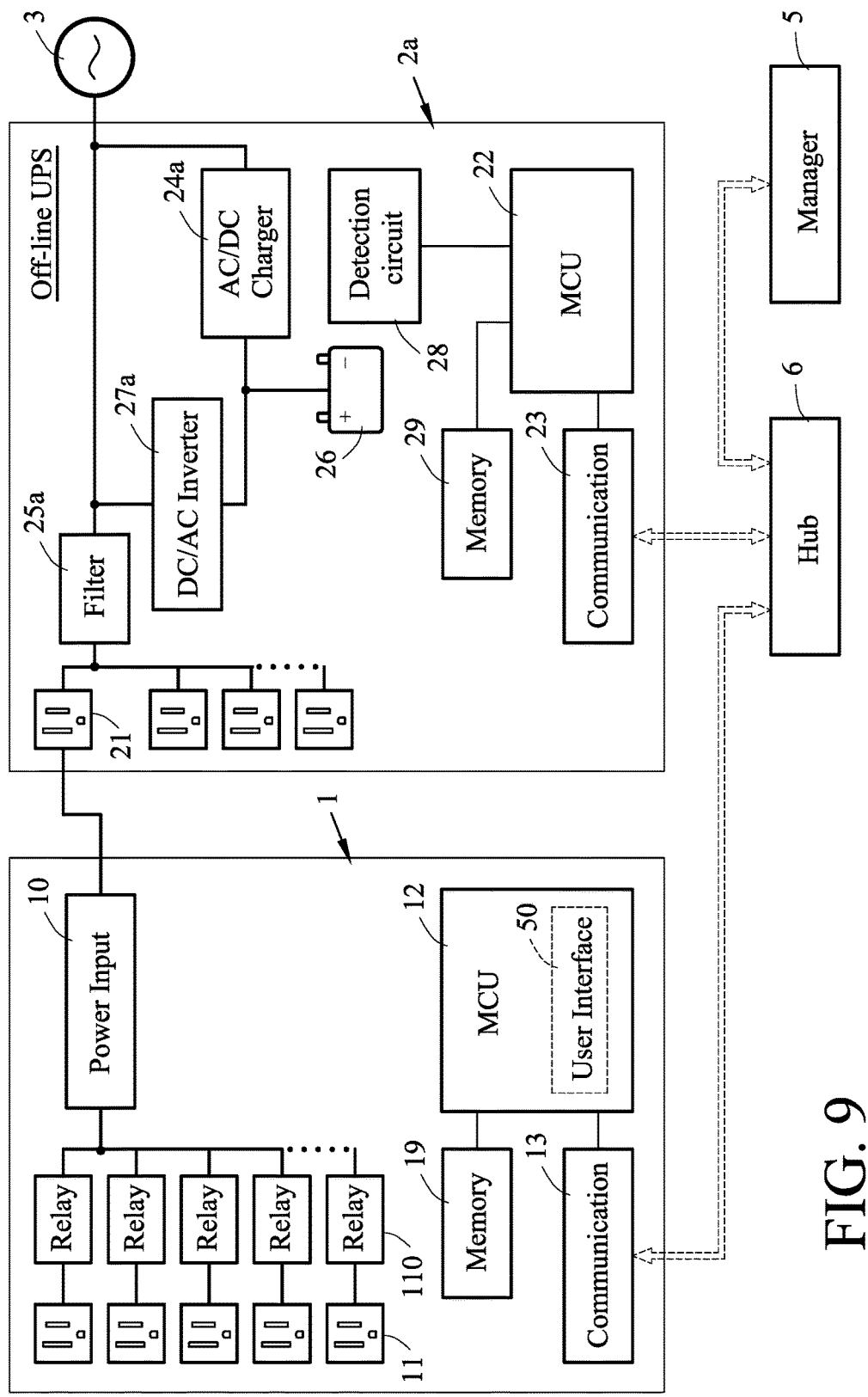
FIG. 9 is a second functional block diagram illustrating the first embodiment of the invention.

Referring to FIG. 9, a second executing manner of UPS can be an off-line UPS 2a, the UPS 2a has an AC to DC charger 24a, a filter 25a and a DC to AC inverter 27a. When the mains power supply 3 can normally supply power to the UPS 2a, the mains power supply 3 can charge the rechargeable battery 26 by the AC to DC charger 24a, the mains power supply 3 can supply power to the second outlet 21 by the filter 25a. When the mains power supply 3 is abnormal, or the power supply is interrupted, the rechargeable battery 26 can supply power to the second outlet 21 by the DC to AC inverter 27a and the filter 25a. Moreover, the second processor 22 can transmit the remaining power parameter to the PDU 1 by the second network interface 23.

Figure 10:
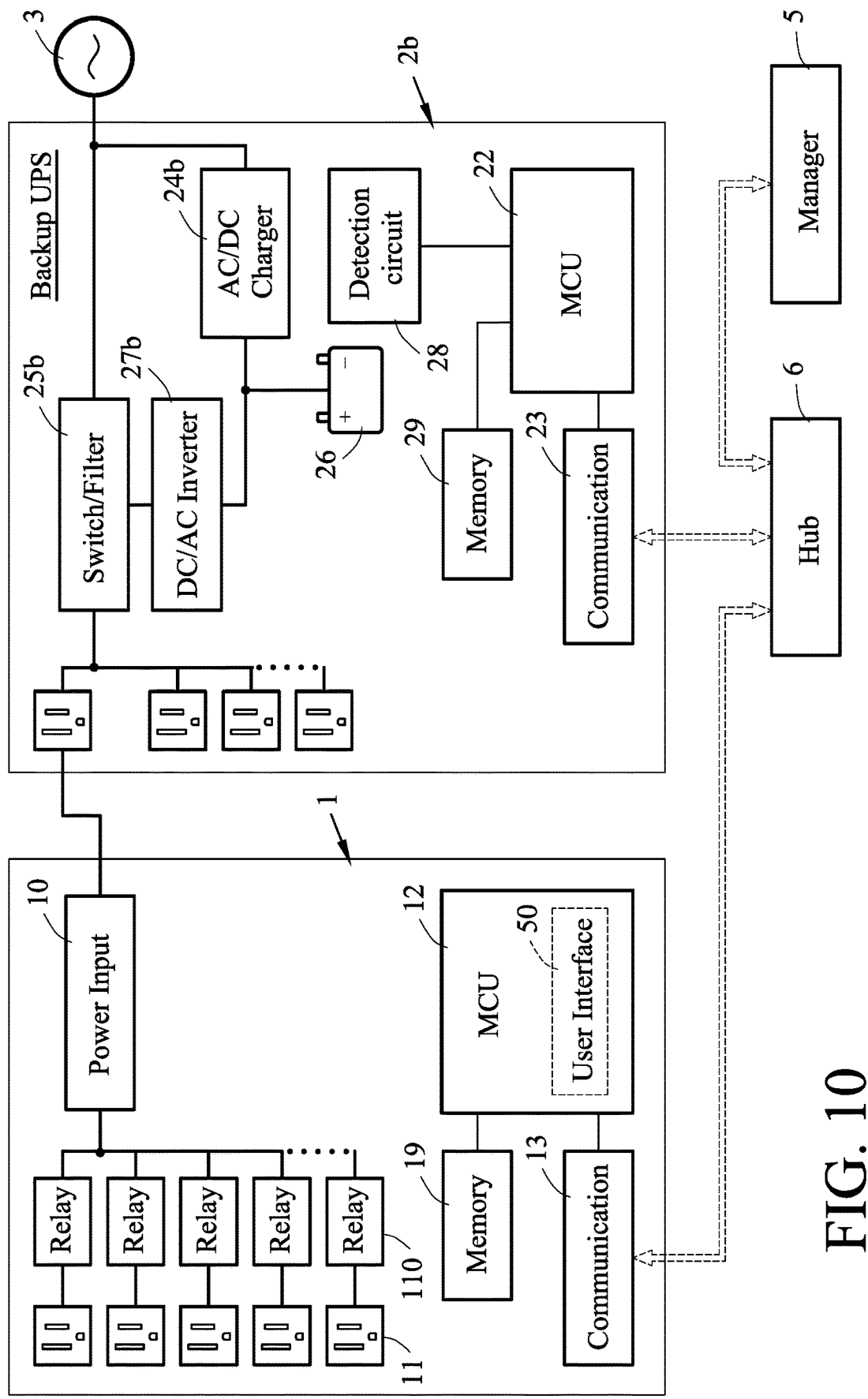
FIG. 10 is a third functional block diagram illustrating the first embodiment of the invention.

Referring to FIG. 10, a third executing manner of UPS can be a backup UPS 2b, the UPS 2b has an AC to DC charger 24b, a switch filter 25b and a DC to AC inverter 27b. When the mains power supply 3 can normally supply power to the UPS 2b, the mains power supply 3 can charge the rechargeable battery 26 by the AC to DC charger 24b, the mains power supply 3 can supply power to the second outlet 21 by the switch filter 25b. When the mains power supply 3 is abnormal, or the power supply is interrupted, the rechargeable battery 26 can supply power to the second outlet 21 by the DC to AC inverter 27b and the switch filter 25b. Moreover, the second processor 22 can transmit the remaining power parameter to the PDU 1 by the second network interface 23.

Figure 11:
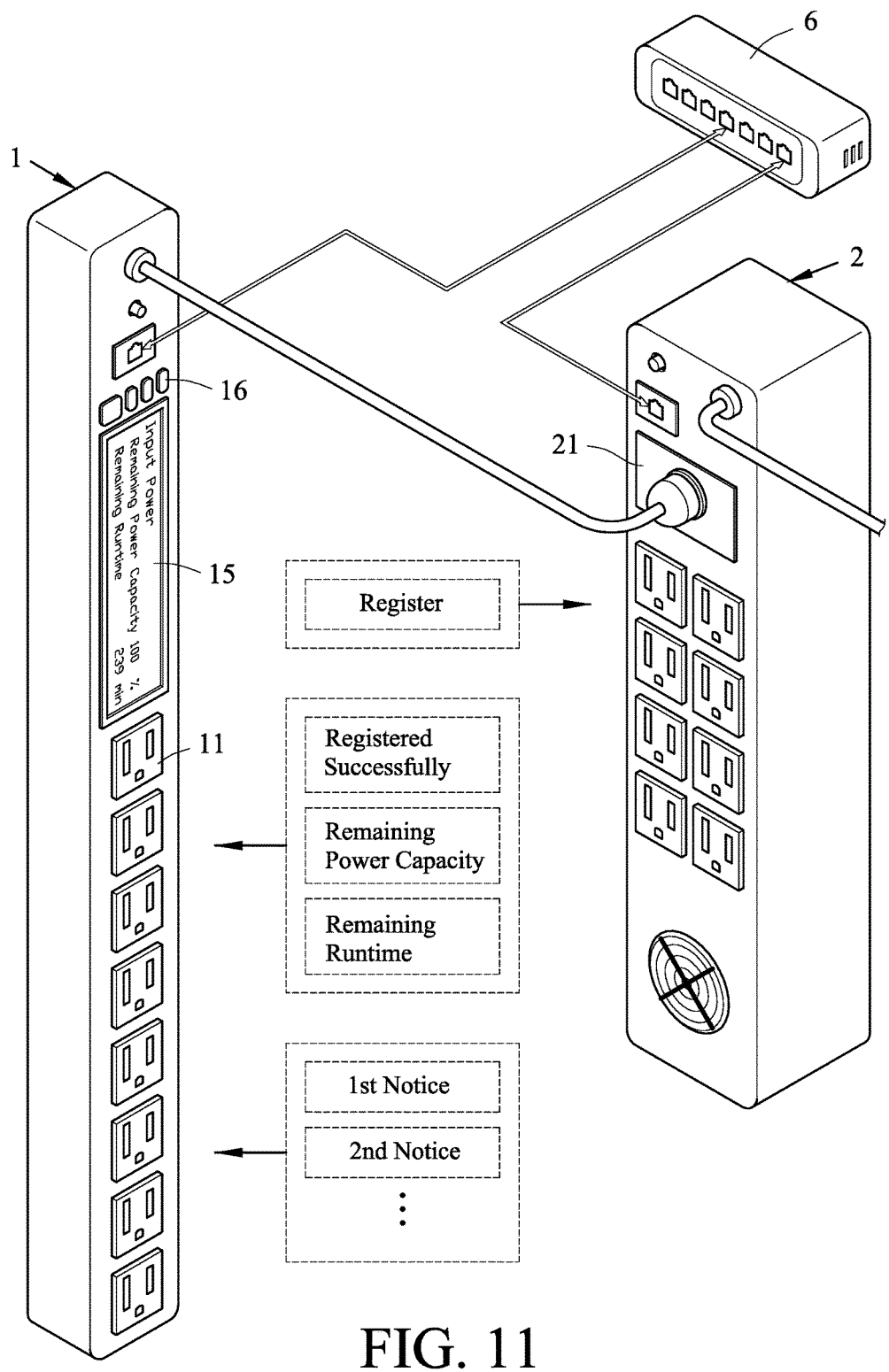
FIG. 11 is a perspective view showing a second embodiment of the invention.
Figure 12:
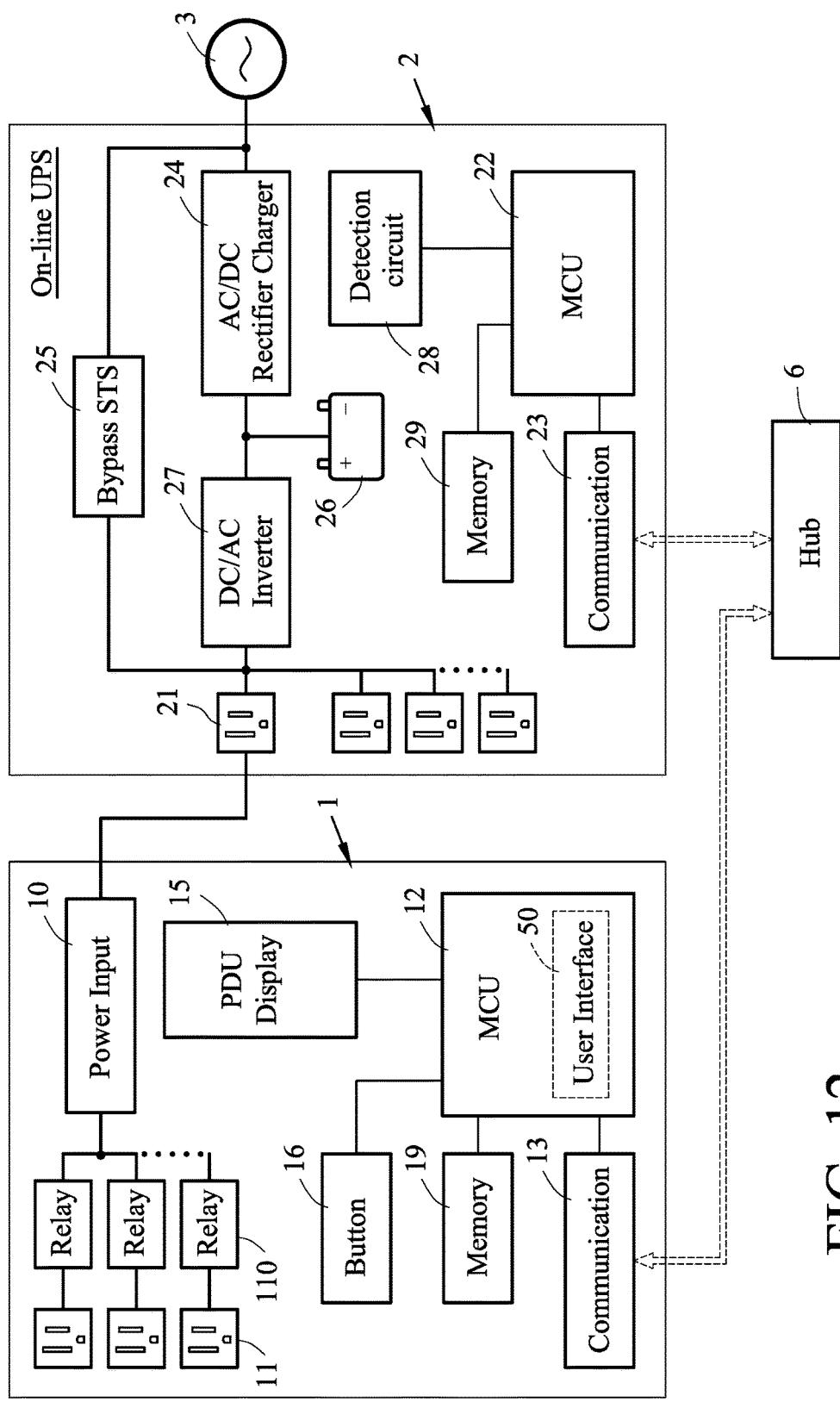
FIG. 12 is a functional block diagram illustrating the second embodiment of the invention.

Referring to FIGS. 11 to 12, a second embodiment is almost same as the first embodiment of the invention, the difference between them is, the PDU 1 has a display unit 15, the display unit 15 is electrically connected to the first processor 12; wherein the first processor 12 can use the first network interface 13 to receive a remaining power parameter which is transmitted from the UPS 2, the display unit 15 can use the user interface 50 to display the remaining power parameter, and the user interface 50 can set up at least one outlet action, the first processor 12 can control at least one relay 110 according to the remaining power parameter, therefore at least one outlet 11 can execute the outlet action. Moreover, the PDU 1 further has a control button unit 16, the control button unit 16 is electrically connected to the first processor 12; wherein the control button unit 16 can use the user interface 50 to set up a type of remaining power parameter, a value of remaining power parameter, an outlet action and an outlet number of at least one first outlet 11, please refer to the description of FIG. 7 for the setting manner of the user interface 50.

Figure 13:
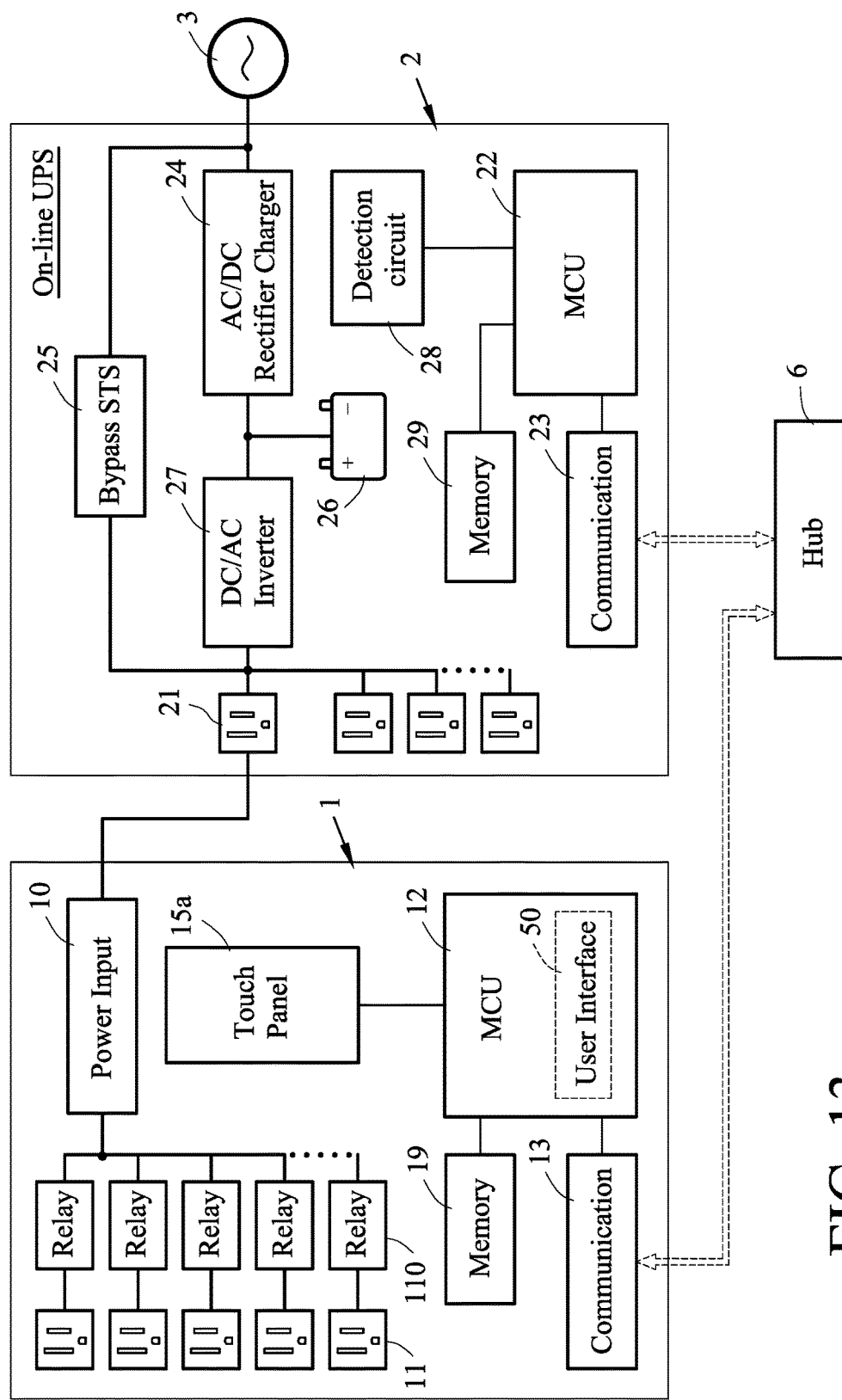
FIG. 13 is a functional block diagram illustrating the third embodiment of the invention.

Referring to FIG. 13, a third embodiment is almost same as the second embodiment of the invention, the difference between them is, the PDU 1 has a touch panel 15a, the touch panel 15a is electrically connected to the first processor 12; wherein the first processor 12 can use the first network interface 13 to receive a remaining power parameter which is transmitted from the UPS 2, the touch panel 15a can use the user interface 50 to set up a type of remaining power parameter, a value of remaining power parameter, an outlet action and an outlet number of at least one first outlet 11, please refer to the description of FIG. 7 for the setting manner of the user interface 50.

Figure 14:
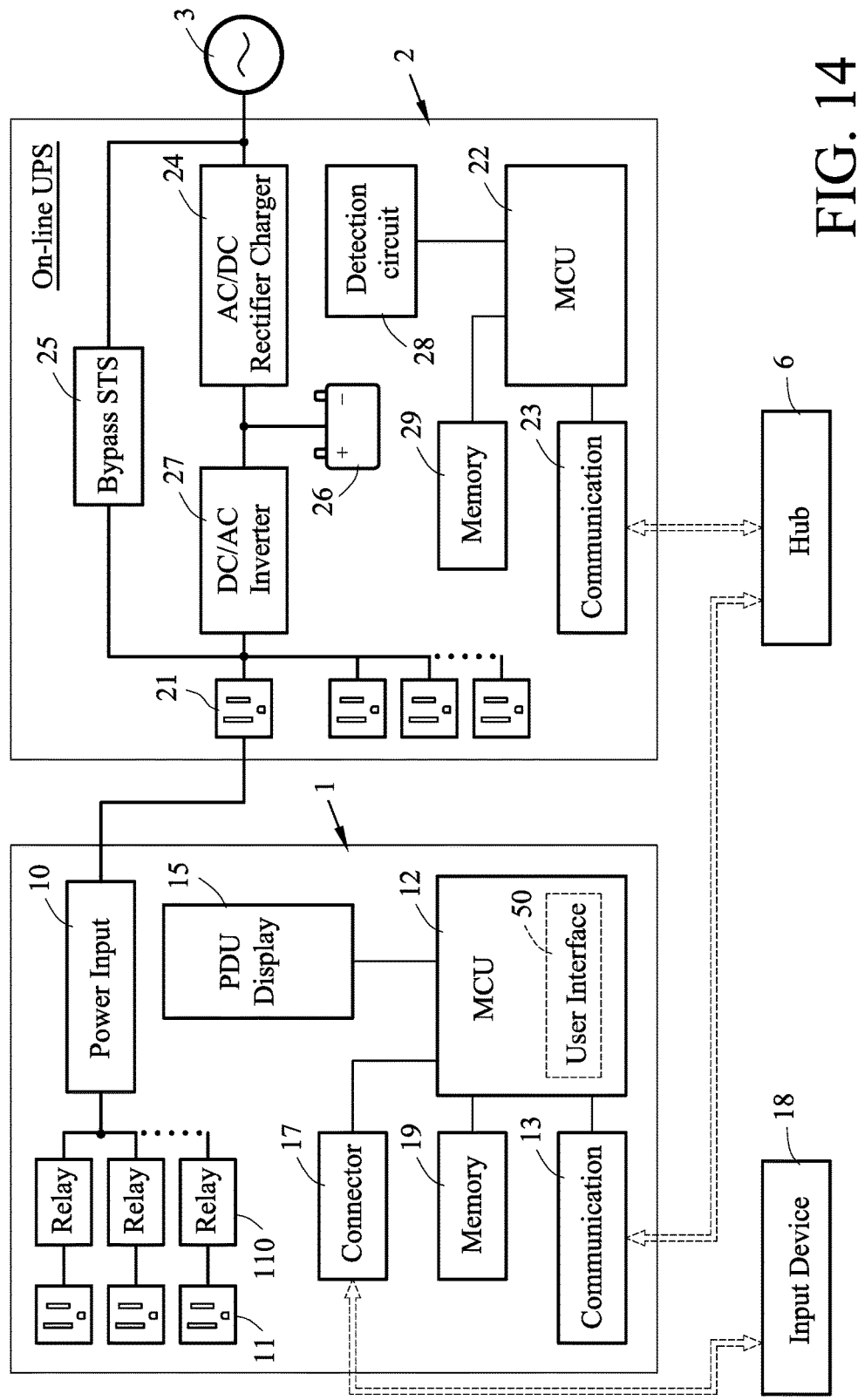
FIG. 14 is a functional block diagram illustrating the fourth embodiment of the invention.

Referring to FIG. 14, a fourth embodiment is almost same as the second embodiment of the invention, the difference between them is, the PDU 1 has a connector 17, the connector 17 can electrically connect an input device 18;

wherein the input device 18 can be selected from a keyboard, a portable electronic device or a cell phone, the input device 18 can use the user interface 50 to set up a type of remaining power parameter, a value of remaining power parameter, an outlet action and an outlet number of at least one first outlet 11, please refer to the description of FIG. 7 for the setting manner of the user interface 50.

What is claimed is:

1. A PDU (power distribution unit) having capability for remaining power management, the PDU comprising:
   a power input terminal (10) electrically connected to a UPS (Uninterruptible Power Supply);
   a plurality of first outlets (11) connected in parallel to the power input terminal (10);
   a plurality of relays (110), each of the relays (110) electrically connected to each of the first outlets (11);
   a first processor (12), the first processor (12) provided with a user interface (50) to register an IP (internet protocol) address of the UPS;
   a first network interface (13), the first network interface (13) communicatively connected to a manager (5) and a second network interface (23) of the UPS via a network hub;
   wherein the first processor (12) uses the first network interface (13) to receive a remaining power parameter which is transmitted from the UPS, the manager (5) uses the user interface (50) to display the remaining power parameter, the manager (5) uses the user interface (50) to set up at least one outlet action, and the first processor (12) controls at least one the relay (110) according to the remaining power parameter, such that the outlet action is executed by at least one of the first outlets (11);
   wherein the user interface (50) is provided with a power event setting page (53), the power event setting page (53) has a type field (532), a setting value field (533), an outlet action field (534) and an outlet number field (535); the type field (532) appoints a type of remaining power parameter, the setting value field (533) sets up a value of remaining power parameter, the outlet action field (534) sets up an outlet action, and the outlet number field (535) sets up the outlet number of at least one of the first outlets (11); and
   wherein the power event setting page (53) has an input area (536) and a Next button (536*a*); a type of remaining power parameter is selected by the input area (536), and a value of remaining power parameter is inputted by the input area (536); the user interface (50) supplies a power event setting subpage (53*a*) by clicking the Next button (536*a*), the power event setting subpage (53*a*) has an outlet action option (534*a*), an outlet number option (535*a*), an Apply button (537) and a Reset button (538); when the Apply button (537) is clocked, the selection content of the input area (536), the selection content of the outlet action option (534*a*) and the selection content of the outlet number option (535*a*) are added to the type field (532), the setting value field (533), the outlet action field (534) and the outlet number field (535); and the outlet action option (534*a*) and the outlet number option (535*a*) are reset by clicking the Reset button (538).

2. The PDU having capability for remaining power management of claim 1, wherein the remaining power parameter is a remaining power capacity of the UPS in each regular time period, and the user interface (50) uses a floating percentage to display the remaining power capacity.

3. The PDU having capability for remaining power management of claim 1, wherein the remaining power parameter is a remaining runtime of the UPS, a second processor (22) of the UPS estimates a remaining runtime according to a remaining power capacity of the UPS, the remaining runtime is equal to the remaining power capacity divided by the power consumption speed of the PDU, and the user interface (50) uses a floating way to display the remaining runtime.

4. The PDU having capability for remaining power management of claim 1, wherein the user interface (50) is provided with an input power configuration page (51), and the input power configuration page (51) has an IP Address field (511), and thereby inputs an IP address of the UPS.

5. The PDU having capability for remaining power management of claim 4, wherein the input power configuration page (51) has an Input Power option (512), an Apply button (513) and a Reset button (514), and therefore is used for starting the binding of the PDU and the UPS, setting up the IP address of the UPS, and resetting the IP address of the UPS.

6. The PDU having capability for remaining power management of claim 1, wherein the user interface (50) is provided with a status page (52), the status page (52) has a Load area (521) and an Input Power area (522), the Load area (521) is used to display a load status of the PDU, and the Input Power area (522) is used to display the remaining power parameter.

7. The PDU having capability for remaining power management of claim 1, wherein the outlet action is selected from the Turn On, the Turn Off, the Delay On, the Delay Off, the Reboot or the Delay Reboot.

8. The PDU having capability for remaining power management of claim 1, wherein the UPS has at least one second outlet (21), a second processor (22), a rechargeable battery (26) and the second network interface (23), the power input terminal (10) of the PDU is electrically connected to the second outlet (21) of the UPS, the second processor (22) detects a remaining power parameter of the rechargeable battery (26) by a detecting circuit (28), the second network interface (23) is communicatively connected to the manager (5); and the UPS is selected from an on-line UPS, an off-line UPS or a backup UPS.

9. A PDU (power distribution unit) having capability for remaining power management, the PDU comprising:
   a power input terminal (10) electrically connected to a UPS (Uninterruptible Power Supply);
   a plurality of first outlets (11) connected in parallel to the power input terminal (10);
   a plurality of relays (110), each of the relays (110) electrically connected to each of the first outlets (11);
   a first processor (12), the first processor (12) provided with a user interface (50) to register an IP (internet protocol) address of the UPS;
   a first network interface (13), the first network interface (13) communicatively connected to a manager (5) and a second network interface (23) of the UPS via a network hub;
   wherein the first processor (12) uses the first network interface (13) to receive a remaining power parameter which is transmitted from the UPS, the manager (5) uses the user interface (50) to display the remaining power parameter, the manager (5) uses the user interface (50) to set up at least one outlet action, and the first processor (12) controls at least one the relay (110) according to the remaining power parameter, such that the outlet action is executed by at least one of the first outlets (11);

wherein the user interface (50) is provided with a power event setting page (53), the power event setting page (53) has a type field (532), a setting value field (533), an outlet action field (534) and an outlet number field (535); the type field (532) appoints a type of remaining power parameter, the setting value field (533) sets up a value of remaining power parameter, the outlet action field (534) sets up an outlet action, and the outlet number field (535) sets up the outlet number of at least one of the first outlets (11);

wherein the power event setting page (53) has a Next button (536a), the user interface (50) supplies a power event setting subpage (53a) by clicking the Next button (536a), the power event setting subpage (53a) has an input area (536), an outlet action option (534a), an outlet number option (535a), an Apply button (537) and a Reset button (538); a type of remaining power parameter is selected by the input area (536), and a value of remaining power parameter is inputted by the input area (536); when the Apply button (537) is clicked, the selection content of the input area (536), the selection content of the outlet action option (534a) and the selection content of the outlet number option (535a) are added to the type field (532), the setting value field (533), the outlet action field (534) and the outlet number field (535); and the input area (536), the outlet action option (534a) and the outlet number option (535a) are reset up by clicking Reset button (538).

10. The PDU having capability for remaining power management of claim 9, wherein the remaining power parameter is a remaining power capacity of the UPS in each regular time period, and the user interface (50) uses a floating percentage to display the remaining power capacity.

11. The PDU having capability for remaining power management of claim 9, wherein the remaining power parameter is a remaining runtime of the UPS, a second processor (22) of the UPS estimates a remaining runtime according to a remaining power capacity of the UPS, the remaining runtime is equal to the remaining power capacity divided by the power consumption speed of the PDU, and the user interface (50) uses a floating way to display the remaining runtime.

12. The PDU having capability for remaining power management of claim 9, wherein the user interface (50) is provided with an input power configuration page (51), and the input power configuration page (51) has an IP Address field (511), and thereby inputs an IP address of the UPS.

13. The PDU having capability for remaining power management of claim 12, wherein the input power configuration page (51) has an Input Power option (512), an Apply button (513) and a Reset button (514), and therefore is used for starting the binding of the PDU and the UPS, setting up the IP address of the UPS, and resetting the IP address of the UPS.

14. The PDU having capability for remaining power management of claim 9, wherein the user interface (50) is provided with a status page (52), the status page (52) has a Load area (521) and an Input Power area (522), the Load area (521) is used to display a load status of the PDU, and the Input Power area (522) is used to display the remaining power parameter.

15. The PDU having capability for remaining power management of claim 9, wherein the outlet action is selected from the Turn On, the Turn Off, the Delay On, the Delay Off, the Reboot or the Delay Reboot.

16. The PDU having capability for remaining power management of claim 9, wherein the UPS has at least one second outlet (21), a second processor (22), a rechargeable battery (26) and the second network interface (23), the power input terminal (10) of the PDU is electrically connected to the second outlet (21) of the UPS, the second processor (22) detects a remaining power parameter of the rechargeable battery (26) by a detecting circuit (28), the second network interface (23) is communicatively connected to the manager (5); and the UPS is selected from an on-line UPS, an off-line UPS or a backup UPS.

\* \* \* \* \*